Dec. 13, 1966   G. D. ARNOLD   3,291,030
APPARATUS FOR STEAMING FOOD PRODUCTS
Filed Dec. 14, 1964   4 Sheets-Sheet 1
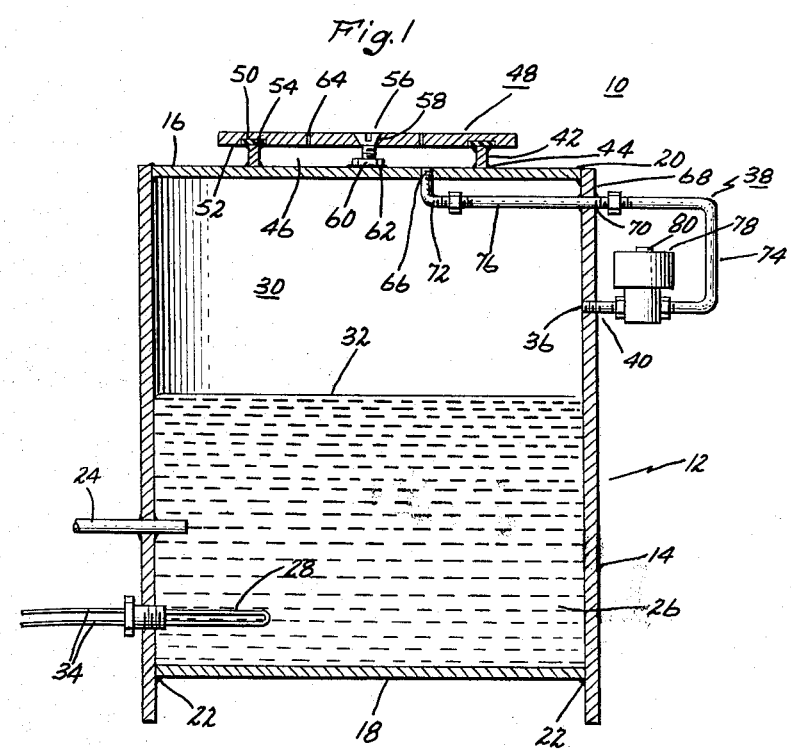
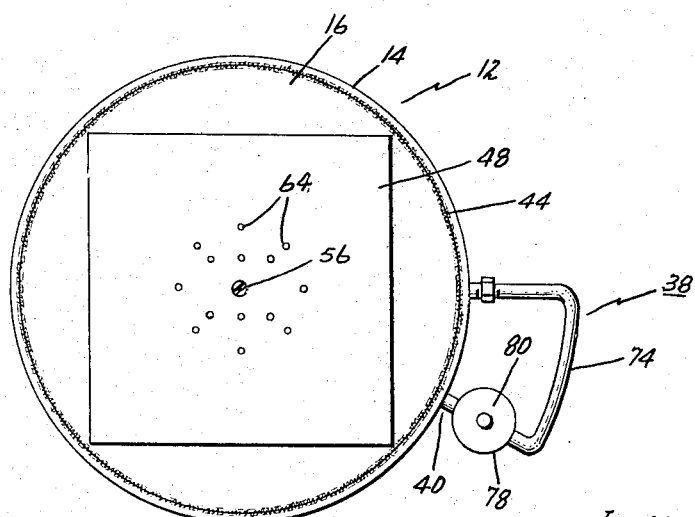
Inventor:
George D. Arnold,
by Hood, Gust & Irish
Attorneys.

Dec. 13, 1966          G. D. ARNOLD           3,291,030
                APPARATUS FOR STEAMING FOOD PRODUCTS
Filed Dec. 14, 1964                           4 Sheets-Sheet 2
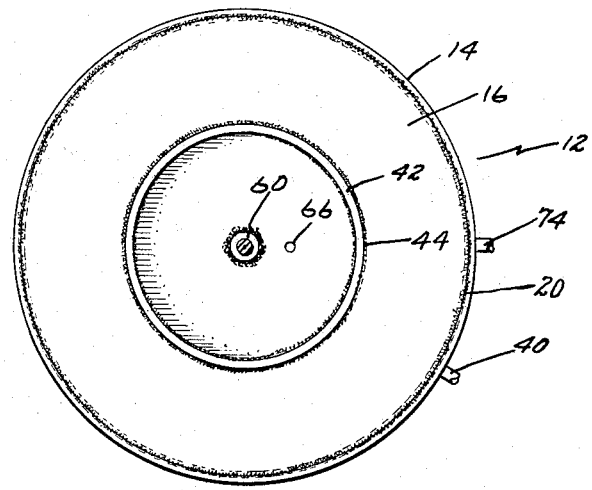
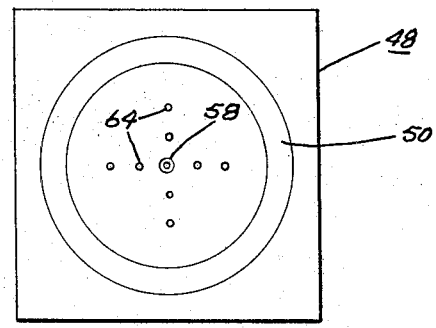
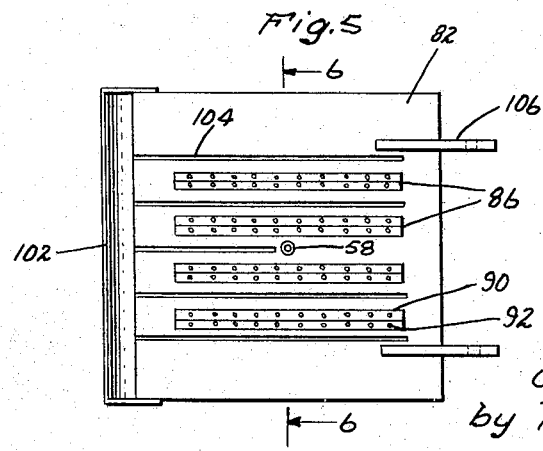
Inventor:
George D. Arnold,
by Hood, Gust & Irish
Attorneys.

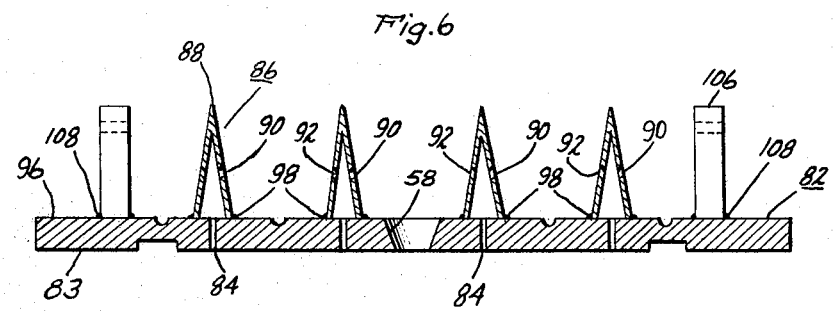
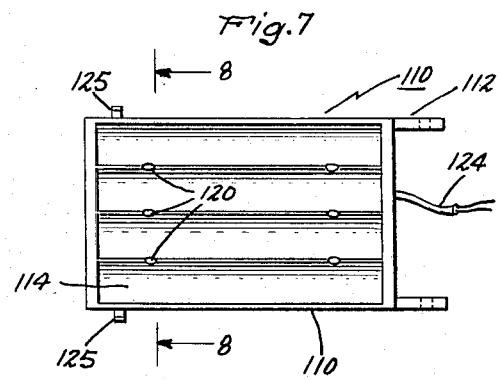
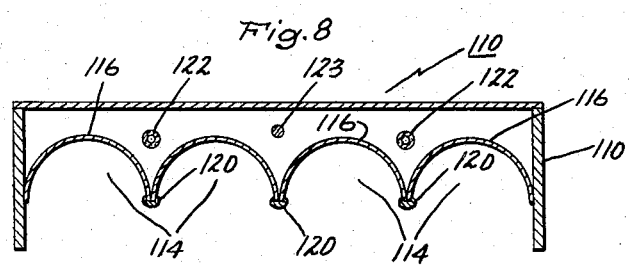
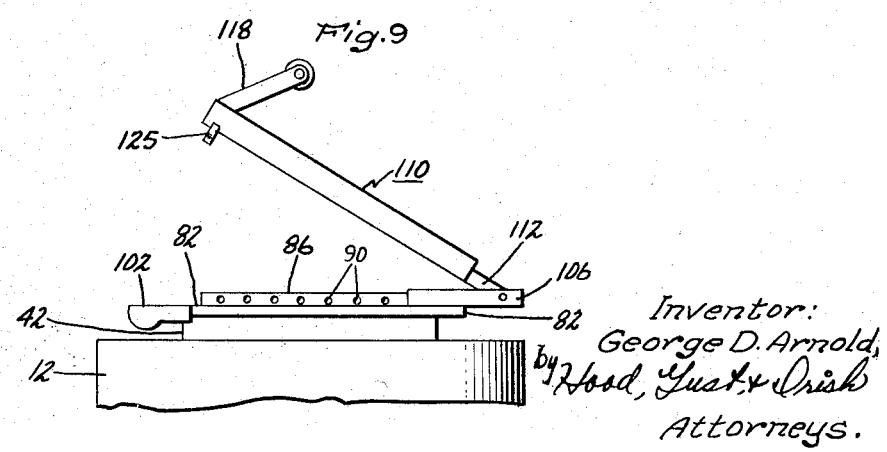
Inventor:
George D. Arnold,
by Hood, Gust & Irish
Attorneys.

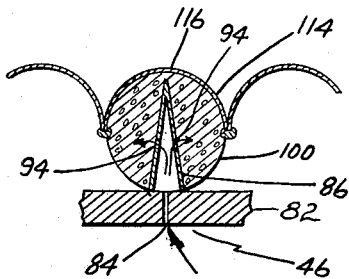
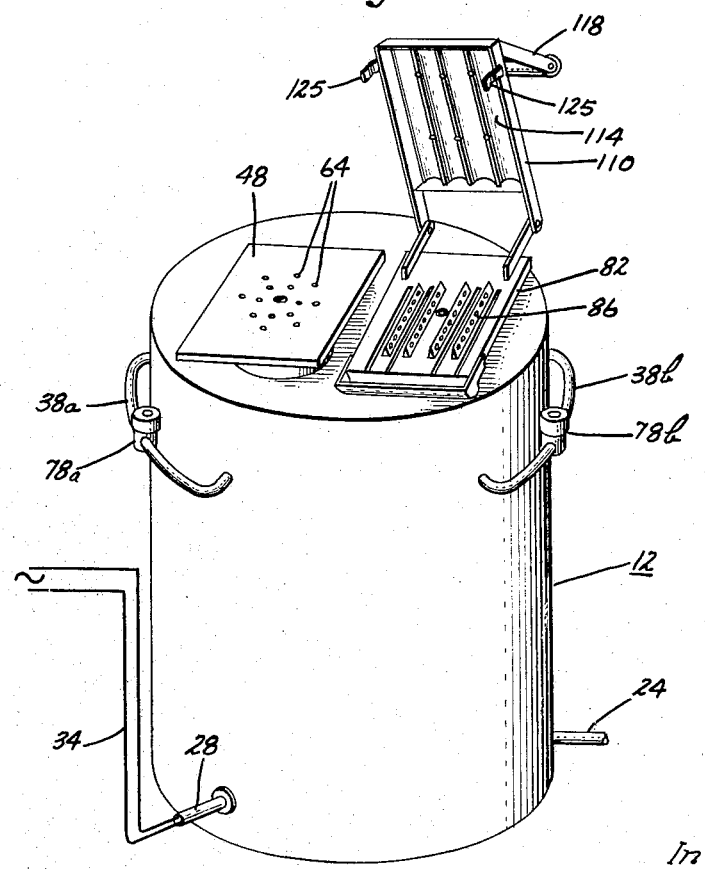

United States Patent Office

3,291,030
Patented Dec. 13, 1966

3,291,030
APPARATUS FOR STEAMING FOOD PRODUCTS
George D. Arnold, Peru, Ind., assignor to The Dewey Shepard Boiler Co., Inc., Peru, Ind., a corporation of Indiana
Filed Dec. 14, 1964, Ser. No. 418,223
16 Claims. (Cl. 99—234)

This invention relates generally to apparatus for heating food products by applying steam thereto, and more particularly to apparatus for steaming food products including bread products, such as hamburger and frankfurter buns, and sausage-type products, such as frankfurters.

In the operation of short-order eating establishments, such as drive-in restaurants, there are occasions when larger quantities of hamburger and frankfurter sandwishes, generally served on buns, must be rapidly prepared and served, and intervening periods when there may be little or no patronage. Such establishments must therefore maintain large quantities of hamburger and frankfurter buns with the accompanying risk that some of them become dry prior to use. It is desirable that all buns be warmed just before sale to the customer and it is therefore desirable to provide apparatus particularly suited for installation in short-order type eating establishments for rapidly warming and freshening buns and other pastry products just prior to serving. It is further desirable to provide apparatus for rapidly heating pre-cooked sausage-type products, such as frankfurters. It is additionally highly desirable that such apparatus be capable of instant use after extended periods of non-use, that all parts to which the food products are exposed be readily demountable for sanitizing and that the apparatus be characterized by its simplicity, economy of operation, and relatively low cost.

It is accordingly an object of the invention to provide improved apparatus for steaming food products.

Another object of the invention is to provide improved apparatus for rapidly steaming food products such as buns and sausage-type products upon instant demand following extended period of non-use.

A further object of the invention is to provide improved apparatus for steaming food products characterized by its efficiency, ease of dissassembly for sanitizing, and relatively low cost.

In accordance with the broader aspects of the invention a steam boiler is provided having a wall defining a pressure vessel for converting water therein into steam, the wall having a steam outlet therein at a first location with one end of a steam line being connected thereto. Means are provided on the wall at a second location spaced from the first location and defining an exterior recess and an apertured member for receiving food products to be warmed is removably secured to the wall so as to close the recess to define a steam chamber therewith, the apertures in the member communicating with the chamber. The wall has a steam exhaust opening therein communicating with the chamber and the steam line extends through the wall into the vessel at a third location spaced from the first and second locations with its other end being connected to the exhaust opening, the steam line thus having a first portion on the exterior of the wall extending between the steam outlet and the third location and a second portion within the vessel extending between the third location and the exhaust opening. Selectively actuable control valve means are provided in the first steam line portion for selectively admitting steam from the pressure vessel to the steam chamber for the exhaust through the apertures in the member.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a cross-sectional view showing one embodiment of the invention adapted for warming pastry products;

FIG. 2 is a top view of the embodiment of FIG 1;

FIG. 3 is a top view of the apparatus of FIGS. 1 and 2 with the warming plate member removed;

FIG. 4 is a bottom view of the warming plate member of FIGS. 1 and 2;

FIG. 5 is a top view of a warming plate assembly adapted for heating sausage-type products;

FIG. 6 is a cross-sectional view taken along the line 6—6 of FIG. 5;

FIG. 7 is a bottom view of the cover member employed with the warming plate member of FIGS. 5 and 6;

FIG. 8 is a cross-sectional view taken along the line 8—8 of FIG 7;

FIG. 9 is a fragmentary side elevational view showing the warming plate and cover members of FIGS. 5–8 assembled on a boiler;

FIG. 10 is a fragmentary cross-sectional view showing the operation of the warming plate and cover members of FIGS. 5–9 in heating a sausage-type product; and FIG. 11 is a perspective view showing appartus in accordance with the invention incorporating both the pastry product warming embodiment of FIGS. 1–4 and the sausage-type product heating apparatus of FIGS. 5–10.

Referring now to FIGS. 1 through 4 of the drawing, the improved food product steaming appartus of the invention, generally indicated at 10, comprises a vertically disposed miniature steam boiler 12 constructed from a cylindrical side wall 14 having its upper end closed by a top plate member 16 and its lower end closed by a recessed bottom plate member 18, the top and bottom plate members 16, 18 being welded to the cylindrical side wall 14, as at 20, 22 thereby to provide a pressure vessel, as is well known to those skilled in the art. It will be readily understood that suitable stay rods (not shown) may be provided for increasing the steam pressure capacity of the boiler 12.

A suitable cold water inlet line 24 extends through the side wall 14 for injecting water into the boiler 12, as at 26, and a conventional immersion-type electric heater 28 extends into the boiler from the side wall 14 so as to be in direct contact with the water for heating the same, thereby to generate steam in the upper portion 30 of the boiler above the water line 32. Immersion heater 28 is provided with external electrical leads 34 connected to a suitable source of potential (not shown) for energizing heater 28. It will be readily understood that conventional boiler accessories such as a water gauge, steam pressure control connected to energize heater 28, and low water cut-off may be provided, as is well known to those skilled in the art.

Side wall 14 of boiler 12 has a steam outlet 36 formed therein above the water line 32 and a steam line 38 is provided having one end 40 connected to the steam outlet 36. A ring 42 is secured to the upper surface of the flat top end wall 16, as by welding at 44, ring 42 thus defining a annular recess 46 with the upper surface of top end plate 16. A plate member 48 is provided, preferably formed of stainless steel, having an annular groove 50 formed in its lower surface 52 and an annular gasket 54 formed of suitable heat-resistor material is seated in groove 50. Plate 48 is removably secured with gasket 54 sealingly engaging the top edge of ring 42 by means of a suitable flat-headed screw 56 seated in a countersunk opening 58 in plate member 48 and threadingly engaging a conventional nut 60 secured to the upper surface of the top end plate 16, as by welding at 62. Plate 48 when thus attached closes the recess 46 to provide a steam chamber. Plate 48 has a plurality of small apertures 64 formed therethrough communicating with the chamber 46, the apertures 64 being arranged in any desired pattern for proper steaming of the desired food products. For hamburger buns, aperture 64 may be arranged in the pattern shown in FIG. 2.

The top end plate 16 has a steam exhaust opening 66 formed therein communicating with the chamber 46. Steam line 38 extends through an opening 68 in the side wall 14 spaced from steam outlet 36, being secured therein as by welding at 70, and has its other end 72 connected to the steam exhaust opening 66 in the top end plate 16. Steam line 38 thus has a first portion 74 disposed on the exterior of boiler 12 extending between steam outlet 36 and opening 68 in side wall 14 and a second portion 76 disposed within boiler 12 and exposed to the steam therein extending between opening 68 in side wall 14 and the steam exhaust opening 66. Portion 76 of the steam line 38 thus heats the steam therein, the steam being further heated by the upper surface of top end wall 16 upon admission to chamber 46, thus inhibiting condensation so as to provide dry steam.

A suitable control valve 78 is connected in the external portion 74 of the steam line 38 for selectively admitting steam from the boiler 12 to chamber 46 for exhausting through the apertures 64. Control valve 78 may be of the manually actuated type having an actuating button 80 thereon or may be of the remotely controlled solenoid-actuated type, both types being commercially available as is well known to those skilled in the art. In certain applications, as will be hereinafter more fully described, control valve 78 may be of the type including a timer for admitting steam to chamber 46 for a precisely predetermined period of time.

It will now be seen that the plate member 48, being removably secured in sealing relation with the ring 42 by means of the screw 56, can be readily removed for thorough cleaning at frequent intervals as required by the health authorities. It will further be seen that the provision of portion 76 of steam line 38 extending through boiler 12 and in contact with the steam therein, and the arrangement of steam chamber 46 immediately on top of the top end plate 16 so that chamber 46 is preheated by heat transfer from the steam in boiler 12 through top end plate 16, inhibits condensation of the steam when admitted to chamber 46 by actuation of valve 78 so that the steam admitted to chamber 46 for exhausting through aperture 64 is essentially dry steam.

Referring now to FIGS. 5–10 of the drawing, a modification of the invention is shown particularly adapted for steaming sausage-type food products, such as frankfurters. Here, plate member 82 is provided again having annular groove 50 formed in its bottom surface 83 for seating annular gasket 54 thereby to provide sealing engagement with ring 42 on the top end plate 16 of boiler 12, plate 82 again being removably attached to top end plate 16 by means of screw 56 seated in countersunk opening 58. In this embodiment, plate member 82 has a plurality of elongated parallel rows of spaced-apart apertures 84 formed therein, four such rows being shown, the rows of apertures 84 again communicating with chamber 46. A plurality of elongated, parallel, upstanding V-shaped knife elements 86 are provided preferably formed of stainless steel and being sharpened at their apices 88. Knife elements 86 respectively have a plurality of spaced-apart apertures 90, 92 formed in their sides and communicating with their interiors 94. Knife elements 86 are secured to the upper surface 96 of plate member 82, as by welding at 98, the knife elements 86 being respectively in alignment with the rows 84 of apertures in the plate member 82 with apertures 84 respectively communicating with the interiors 94. Thus, when steam is admitted to chamber 46 by an actuation of control valve 78, as above-described, steam will be exhausted through the rows of apertures 84 in plate member 82 into the interiors 94 of the knife elements 86, and in turn through the apertures 90, 92. Knife elements 86 are adapted to receive and partially split a sausage-type food product, such as a frankfurter 100 as shown in FIG. 10, so that the steam exhausted from chamber 46 through apertures 84, 90, 92 is applied to the interior of a frankfurter thereby rapidly to heat the frankfurter to the desidered degree.

A suitable grease tray 102 may be provided formed of suitable sheet metal and removably slipped onto one end of the plate member 82. The upper surface 96 of the plate member 82 may have a plurality of shallow grooves 104 formed therein for conveying grease to the grease tray 102. As best seen in FIG. 9, it may be desirable to form the top edge of the ring 42 with a slight taper so that the plate member 82 is slightly inclined toward the grease tray 102 thereby to cause the grease provided by heating of the frankfurters to drain toward and into the grease tray 102.

A pair of hinge elements 106 are secured to the upper surface 96 of the plate member 82 as by welding at 108, and a cover member 110 is pivotalbly mounted on the hinge element 106 by means of cooperating hinge elements 112. Cover member 110 has a plurality of elongated, parallel cavities 114 formed in its lower surface respectively in alignment with the knife elements 86 on the plate member 82. Cavities 114 may be formed by a plurality of generally semi-circular elements 116 preferably formed of relatively thin-gauge stainless steel. Cover member 110 may have a suitable handle 118 thereon by which the cover member 110 may be pivoted from a first open position, as seen in FIGS 9 and 11, in which the cavities 114 are pivoted away from the plate member 82, to a second closed position in which the knife elements 86 respectively extend into the cavities 114, as best seen in FIG. 10. The frankfurters 100 are thus intially placed in the cavities 114 when the cover 110 is in its open position, the frankfurters 100 thus being received in and retained in the cavities 114. In order to facilitate retention of the frankfurters 100 in the cavities 114, suitable knobs 120 may be formed, as by drops of solder, on the junctions of adjacent elements 116, the knobs 120 engaging the frankfurters 100 and holding them securely in the cavities 114, as best seen in FIG. 10. It will now be seen that when the cover member 110 is pivoted downwardly to its closed position, the frankfurters 110 in the cavities 114 are respectively impaled upon the knife elements 86 which preferably split the frankfurters substantially through to the top skin, as shown in FIG. 10. Following this, valve 78 may be actuated in order to admit steam to chamber 46 for exhausting through apertures 84, 90, 92 into the interior of the frankfurters, as above-described. For this purpose, a commercially available valve 78 of the type having a timer incorporated therein is desirably employed in order precisely to control the duration of the application of steam to the frankfurters. A solenoid-actuated valve having a time-actuated switch is suitable, such switches conventially incorporating a selectively adjustable timing mechanism by which the timing may be adjusted. A timing from thirty to sixty seconds has been found to be suitable for most domestic varities of frankfurters.

As above-described, there may be extended periods of time during which there will be no call for frankfurters heated by the above-described apparatus. During these periods, the water 26 and the boiler 12 is heated by the immersion heater 28, it being observed, however, that minimum electrical power consumption is required in order to maintain a head of steam continuously and immediately available. It will be seen, however, that with steam being continuously provided in boiler 12, actuation of control valve 78 will immediately admit the steam to the chamber 46 for immediate exhaust through the apertures 64 of the plate member 48 of FIGS. 1 through 4, or through the apertures 84, 90, 92 in the plate member 82 and knife elements 86 of the embodiment of FIGS. 5 through 10. However, in the case of the embodiment of FIGS. 5 through 10, knife elements 86 if normally exposed to ambient temperature might be sufficiently cooled to cause condensation of the steam exhausted through apertures 90, 92. In order to preheat the upper surface 96 of the plate member 82, and the knife elements 86 in order to inhibit such condensation, a suitable electrical heating element 122 may be provided overlaying the semi-circular elements 116 forming the cavities 114, as best seen in FIG. 8, heating element 122 being adapted to be continuously energized through a suitable thermostate 123 and electrical leads 124 connected to a suitable source of potential (not shown). Conventional spring latches 125 may be mounted on cover member 10 for engaging plate member 82, as shown.

Referring now to FIG. 11, it will be seen that one of the plate members 48 with the apertures 64 therein for steaming buns and one of the plate members 82 having the knife elements 86 thereon and the cooperating cover 110 may be installed on the top end plate member 16 of the same boiler 12. In this case, separate steam lines 38a, 38b are provided with control valves 78a, 78b being respectively connected therein, as shown. It will be understood that control valve 78a is employed for admitting steam to the chamber 46 associated with plate member 48 while control valve 78b is employed for admitting steam to the chamber 46 associated with the plate member 82.

While I have described above the principles of my invention in connection with specific apparatus, it is to be clearly understood that this description is made only by way of example and not as a limitation to the scope of my invention.

What is claimed is:

1. Apparatus for steaming food products comprising: a steam boiler having a wall defining a pressure vessel for converting water therein into steam, said wall having a steam outlet therein at a first location; a steam line having one end connected to said steam outlet; means on said wall at a second location spaced from said first location and defining an exterior recess; an apertured member for receiving food products to be warmed removably secured to said wall and closing said recess to define a steam chamber therewith, said apertures communicating with said chamber; said wall having a steam exhaust opening therein communicating with said chamber; said steam line extending through said wall into said vessel at a third location spaced from said first and second locations and having its other end connected to said exhaust opening, said steam line having a first portion on the exterior of said wall extending between said steam outlet and third location and a second portion within said vessel extending between said third location and said exhaust opening, and selectively actuable control valve means in said first steam line portion for selectively admitting steam from said vessel to said chamber for exhaust through the apertures in said member.

2. The apparatus of claim 1 wherein said boiler wall has a vertically disposed side wall portion and top and bottom wall portions, wherein said first and third locations are on said side wall portion and said second location is on said top wall portion.

3. The apparatus of claim 1 wherein said first-named means comprises another wall secured to the exterior of said boiler wall and defining said recess therewith.

4. The apparatus of claim 1 wherein said boiler wall has a vertically disposed cylindrical side wall portion and top and bottom end wall portions, said top end wall portion being substantially flat, wherein said first and third locations are on said side wall portion and said second location is on said top end wall portion, wherein said first-named means comprises another wall secured to the exterior of said top end wall portion and defining said recess therewith, said other wall having a top edge, said member sealingly engaging said top edge, and further comprising fastener means removably securing said member to said top end wall portion.

5. The apparatus of claim 4 wherein said other wall is annular, wherein said member has an annular groove formed in its bottom surface with gasket means seated therein for sealingly engaging the top edge of said other wall, and wherein said fastener means comprises a nut secured to said top end wall portion within said recess and a stud passing through an opening in said member and engaging said nut.

6. Apparatus for steaming food products comprising: a vertically disposed steam boiler having a cylindrical side wall and flat top and bottom end walls mutually defining a pressure vessel, said boiler having means for heating water therein thereby to generate steam, said side wall having a steam outlet therein above the water line; a steam line having one end connected to said steam outlet; an annular ring welded to the upper surface of said top end wall and defining a recess therewith; an apertured flat plate member for receiving food products to be warmed and having an annular groove formed in its bottom surface with gasket means seated therein, said plate member extending across said ring with said gasket means sealingly engaging the top edge thereof thereby closing said recess to define a steam chamber therewith, said apertures communicating with said chamber; threaded fastener means removably securing said plate member to said ring; said top end wall having a steam exhaust opening therein communicating with said chamber; said steam line extending through an opening in said side wall spaced from said steam outlet and into said vessel and having its other end connnected to said exhaust opening, said steam line having a first portion on the exterior of said side wall extending between said steam outlet and said side wall opening and a second portion within said vessel and exposed to the steam therein extending between said side wall opening and said exhaust opening; and selectively actuable control valve means in said first steam line portion for selectively admitting steam from said vessel to said chamber for exhaust through said apertures in said plate member.

7. Apparatus for steaming food products comprising: a steam boiler having a wall defining a pressure vessel for converting water therein into steam, said wall having a steam outlet therein at a first location; a steam line having one end connected to said steam outlet; means on said wall at a second location spaced from said first location and defining an exterior recess; a member having a lower surface removably secured to said means and closing said recess to define a steam chamber therewith, said member having an elongated knife portion on its upper surface for receiving and partially splitting a sausage-type food product, said knife portion having apertures therein communicating with said chamber for conveying steam to the interior of said food product; said wall having a steam exhaust opening therein communicating with said chamber; said steam line extending through said wall into said vessel at a third location spaced from said first and second locations and having its other end connected to said exhaust opening, said steam line having a first portion on the exterior of said wall extending between said steam outlet and third location and a second portion within said vessel extending between said third locations and said exhaust opening; and selectively actuable control valve means in said first steam line portion for selectively admitting steam from said vessel to said chamber for exhaust through the apertures in said member.

8. The apparatus of claim 7 further comprising: a cover having an elongated cavity therein for receiving and holding said food product, and means mounting said cover on said member for movement between a first open position away from said member whereby said food product may be inserted in said cavity, and a second closed portion with said knife portion extending into said cavity whereby said food product is impaled on said knife portion and is held thereon during admission of steam thereto.

9. The apparatus of claim 8 further comprising: heating means in said cover whereby said member and knife portions are normally heated when said cover is in said second position thereby inhibiting condensation of said steam when admitted to said chamber.

10. The apparatus of claim 7 further comprising: a cover having an elongated cavity formed in its lower surface for receiving and holding said food product, said cover being pivotably mounted on said member for movement between a first open position with said lower cover surface pivoted away from said upper surface of said member whereby said food product may be inserted in said cavity, and a second closed position with said knife portion extending into said cavity whereby said food product is impaled on said knife portion and is held thereon during admission of steam thereto, and heating means in said cover overlying said cavity whereby said member and knife portions are normally heated when said cover is in said second position thereby inhibiting condensation of said steam when admitted to said chamber.

11. Apparatus for steaming food products comprising: a steam boiler having a wall defining a pressure vessel for converting water therein into steam, said wall having a steam outlet therein at a first location; a steam line having one end connected to said steam outlet; means on said wall at a second location spaced from said first location and defining an exterior recess; a flat plate member having a lower surface removably secured to said means and closing said recess to define a steam chamber therewith, said plate member having a plurality of elongated parallel rows of spaced-apart apertures formed therethrough communicating with said chamber; a plurality of elongated upstanding V-shaped knife elements for receiving and partially splitting sausage-type food products, said elements respectively having spaced-apart apertures in their sides communicating with their interiors, said elements being secured to the upper surface of said plate member respectively in alignment with said rows of apertures therein and communicating therewith whereby steam is conveyed from said chamber to the interior of said food products through said apertures; said wall having a steam exhaust opening therein communicating with said chamber; said steam line extending through said wall into said vessel at a third location spaced from said first and second locations and having its other end connected to said exhaust opening, said steam line having a first portion on the exterior of said wall extending between said steam outlet and third location and a second portion within said vessel extending between said third locations and said exhaust opening; and selectively actuable control valve means in said first steam line portion for selectively admitting steam from said vessel to said chamber for exhaust through the apertures in said member.

12. The apparatus of claim 11 further comprising: a cover having a plurality of elongated parallel cavities formed in its lower surface for receiving and holding said food products, said cover being pivotably mounted on said plate member for movement between a first open position with said lower cover surface pivoted away from said upper surface of said plate member whereby said food products may be inserted in and removed from said cavities, and a second closed position with said knife elements respectively extending into said cavities whereby said food products are respectively impaled on said knife elements and held thereon during admission of steam thereto, and a heating element in said cover overlying said cavities whereby said plate member and knife elements are normally heated when said cover is in said second position thereof thereby inhibiting condensation of said steam when admitted to said chamber.

13. Apparatus for steaming food products comprising: a vertically disposed steam boiler having a cylindrical side wall and flat top and bottom end walls mutually defining a pressure vessel, said boiler having means for heating water therein thereby to generate steam, said side wall having a steam outlet therein above the water line; a steam line having one end connected to said steam outlet; an annular ring welded to the upper surface of said top end wall and defining a recess therewith; a flat plate member having an annular groove formed in its bottom surface with gasket means seated therein, said plate member extending across said ring with said gasket means sealing engaging the top edge thereof thereby closing said recess to define a steam chamber therewith; threaded fastener means removably securing said plate member to said top end wall, said plate member having a plurality of elongated parallel rows of spaced-apart apertures formed therethrough communicating with said chamber; a plurality of elongated upstanding V-shaped knife elements for receiving and partially splitting sausage-type food products, said elements respectively having spaced-apart apertures in their sides communicating with their interior, said elements being secured to the upper surface of said plate member respectively in alignment with said rows of apertures therein and communicating therewith whereby steam is conveyed from said chamber to the interior of said food products through said apertures; said top end wall having a steam exhaust opening therein communicating with said chamber; said steam line extending through an opening in said side wall spaced from said steam outlet and into said vessel and having its other end connected to said exhaust opening, said steam line having a first portion on the exterior of said side wall extending between said steam outlet and said side wall opening and a second portion within said vessel and exposed to the steam therein extending between said side wall opening and said exhaust opening; selectively actuable control valve means in said first steam line portion for selectively admitting steam from said vessel to said chamber for exhaust through said apertures in said plate member; a cover having a plurality of elongated parallel cavities formed in its lower surface for receiving and holding said food products, said cover being pivotably mounted on said plate member for movement between a first open position with said lower cover surface pivoted away from said upper surface of said plate member whereby said food products may be inserted in and removed from said cavities, and a second closed position with said knife elements respectively extending into said cavities whereby said food products are respectively impaled on said knife elements and held thereon during admission of steam thereto, and a heating element in said cover overlying said cavities whereby said plate member and knife elements are normally heated when said cover is in said second position thereof thereby inhibiting condensation of said steam when admitted to said chamber.

14. In apparatus for steaming sausage-type food products, a member having upper and lower surfaces, said member having an elongated knife portion on said upper surface for receiving and partially splitting a said food product, said knife portion having apertures therein communicating with said lower surface for conveying steam from a steam source to the interior of said food product; a cover having an elongated cavity therein for receiving and holding said food product; and means mounting said cover on said member for movement between a first open position away from said member whereby said food product may be inserted in said cavity, and a second closed position with said knife portion extending into said cavity whereby said food product is impaled on said knife portion and is held thereon during admission of steam thereto.

15. The apparatus of claim 14 further comprising heating means in said cover for normally heating said member and knife portion when said cover is in said second position thereby inhibiting condensation of said steam when admitted to said apertures.

16. In apparatus for steaming sausage-type food products, a flat plate member having upper and lower surfaces, said plate member having a plurality of elongated parallel rows of spaced-apart apertures formed therethrough; means for removably attaching said plate member to a steam source thereby to admit steam to said apertures; a plurality of elongated upstanding V-shaped knife elements for receiving and partially splitting sausage-type food products, said elements respectively having spaced-apart apertures in their sides communicating with their interiors, said elements being secured to the upper surface of said plate member respectively in alignment with said rows of apertures therein and communicating therewith whereby steam is conveyed to the interior of said food products through said apertures; a cover having a plurality of elongated parallel cavities formed in its lower surface for receiving and holding said food products, said cover being pivotably mounted on said plate member for movement between a first open position with said lower cover surface pivoted away from said upper surface of said plate member whereof said food products may be inserted in and removed from said cavities, and a second closed position with said knife elements respectively extending into said cavities whereby said food products are respectively impaled on said knife elements and held thereon during admission of steam thereto, and a heating element in said cover overlying said cavities whereby said plate member and knife elements are normally heated when said cover is in said second position thereof thereby inhibiting condensation of steam when admitted to said apertures.

References Cited by the Examiner
UNITED STATES PATENTS

| | | | |
|---|---|---|---|
| 2,218,263 | 10/1940 | Lewis | 99—234 |
| 2,617,349 | 11/1952 | Tucker | 99—234 |
| 2,620,789 | 12/1952 | Gregory | 99—234 |
| 2,804,009 | 8/1957 | Holland | 99—234 |
| 2,815,530 | 12/1957 | Alexander | 99—419 |
| 3,069,994 | 12/1962 | Lewis | 99—234 |

WALTER A SCHEEL, *Primary Examiner.*

R. W. JENKINS, *Assistant Examiner.*